Dec. 26, 1967   D. E. BRODERSON   3,360,055
POLE HANDLING VEHICLE

Filed April 25, 1966   5 Sheets-Sheet 1

INVENTOR.
DEAN E. BRODERSON
BY
Cushman, Darby & Cushman
ATTORNEYS

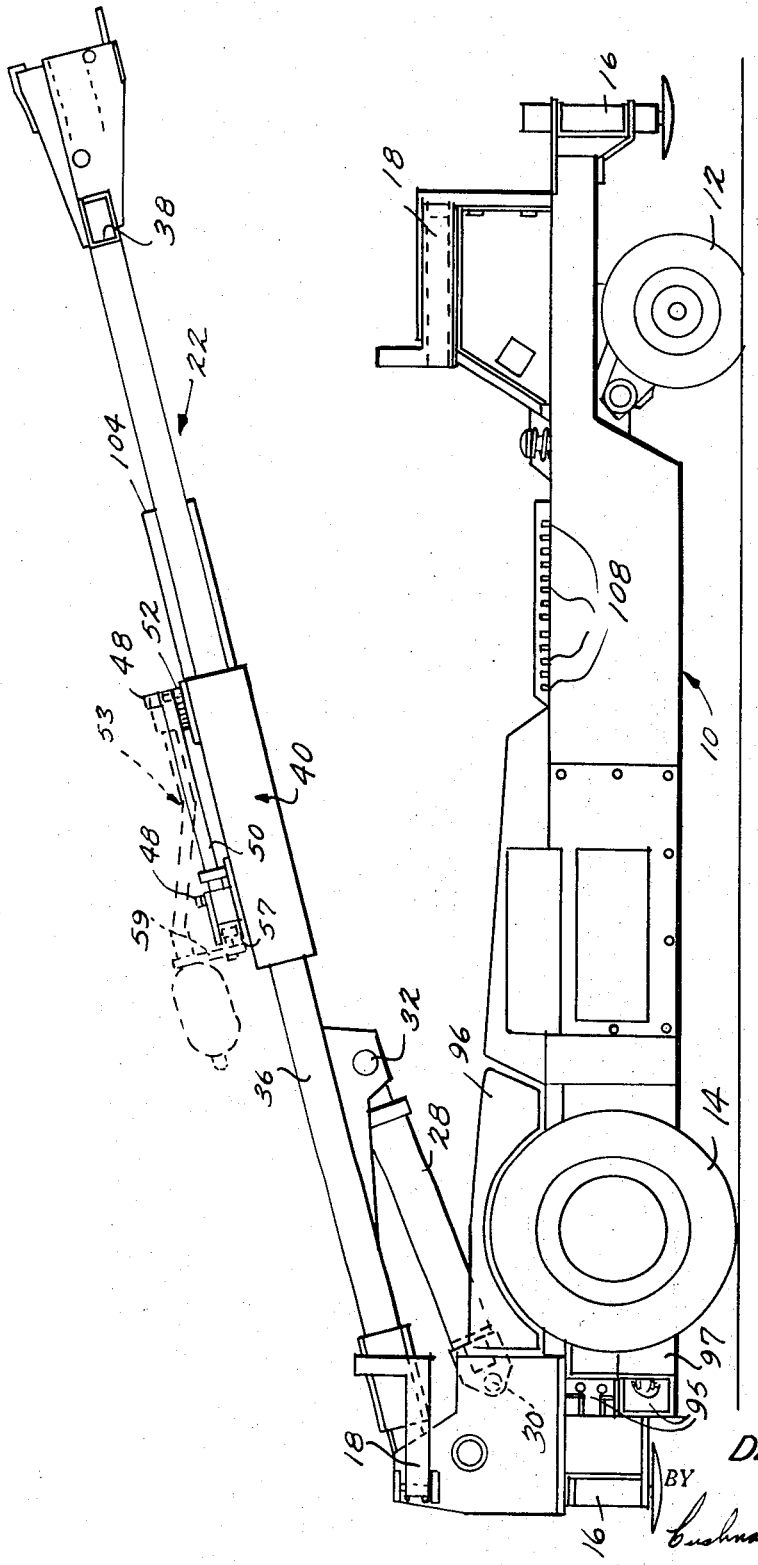

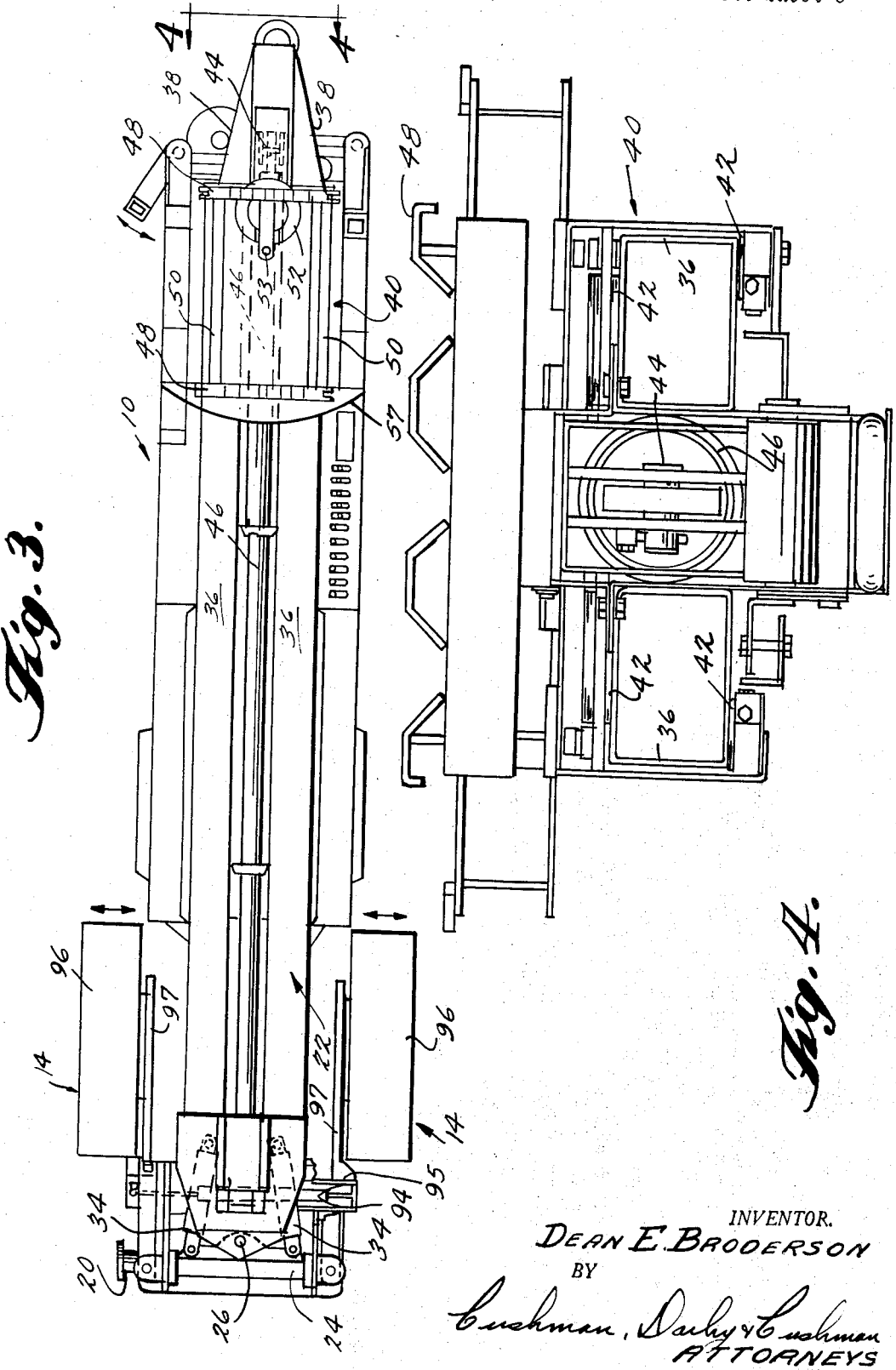

Dec. 26, 1967  D. E. BRODERSON  3,360,055
POLE HANDLING VEHICLE
Filed April 25, 1966  5 Sheets-Sheet 4
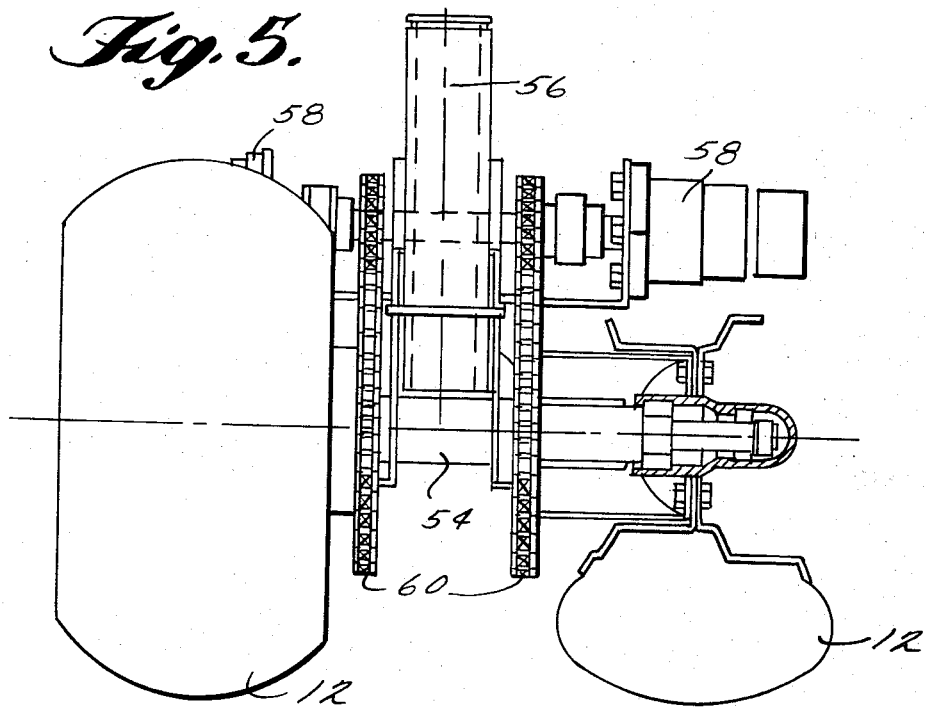
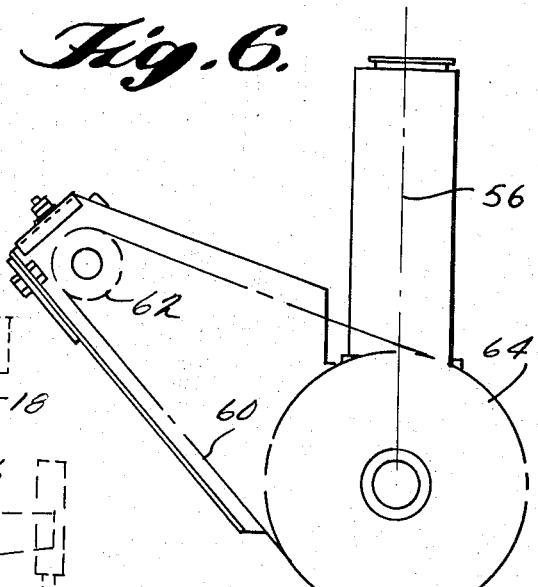
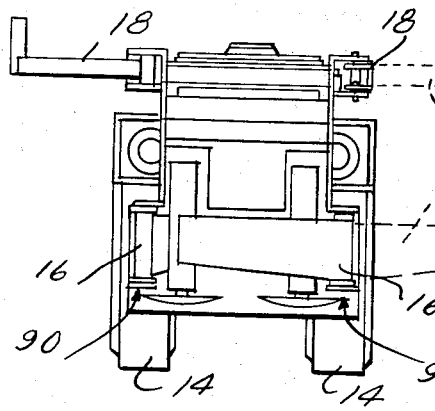
INVENTOR.
DEAN E. BRODERSON
BY
Cushman, Darby & Cushman
ATTORNEYS Dec. 26, 1967   D. E. BRODERSON   3,360,055
POLE HANDLING VEHICLE
Filed April 25, 1966   5 Sheets-Sheet 5

INVENTOR.
DEAN E. BRODERSON
BY
Cushman, Darby & Cushman
ATTORNEYS

United States Patent Office 3,360,055
Patented Dec. 26, 1967

3,360,055
POLE HANDLING VEHICLE
Dean E. Broderson, 10116 Forest,
Kansas City, Mo. 64131
Filed Apr. 25, 1966, Ser. No. 544,985
10 Claims. (Cl. 173—28)

ABSTRACT OF THE DISCLOSURE

A self-propelled vehicle having a boom means attached is constructed to carry and handle poles, such as utility poles. The vehicle is provided with a boom which is pivotally mounted at one end to the vehicle for movement relative to the vehicle, and the boom includes a carriage means and a cradle for carrying a pole on the boom. The cradle can be extended along the longitudinal axis of the boom and also rotated about an axis at right angles to the main body of the boom. The boom may also be tilted from side to side relative to the vehicle, and power means may be provided for extending and retracting the wheels of the vehicle.

---

This invention relates to apparatus for handling utility poles and for setting them in and removing them from vertical positions in the earth. In particular, the invention is concerned with a self-propelled vehicle which can carry a utility pole into relatively inaccessible areas and which can raise a pole and set it into a hole in the earth.

Utility companies continually face the difficult problems of installing and maintaining operating systems in inaccessible areas such as residential easements, narrow alleys, and sub-stations. The work involved at these locations includes digging holes, setting poles, placing transformers, trimming trees, and maintaining insulators, conductors and miscellaneous hardware. One basic problem of operating in these areas is the transportation of the tools and materials into the job site. Another is the requirement for some structure to handle the overhead jobs involved. Another is the requirement for power to perform all these jobs safely and efficiently without the use of excessive physical effort.

Devices have been used in the past for carrying utility poles to a location where the poles are to be installed in vertical positions. Such devices have even included means for raising the pole from a horizontal position to a vertical position so that the pole can be set into the earth, and provision has been made for digging a hole with the device just prior to setting the pole. However, prior devices have been unsuccessful in providing easily operated apparatus which can handle a pole safely over uneven terrain and under a variety of handling conditions.

The present invention provides an improved self-propelled vehicle having novel means for driving the vehicle and for handling a pole. The vehicle includes a chassis of an elongated form with pairs of wheels at each end of the chassis for supporting the vehicle and a pole carried on the vehicle. One pair of wheels is driven in a novel manner with separate hydraulic motors, and the same pair of wheels may be turned up to 90° in either direction for executing maneuvering movements of the vehicle in relatively inaccessible areas. A second pair of wheels at the opposite end of the vehicle is mounted to be extended and retracted in lateral directions relative to the vehicle chassis. This permits the wheels to be moved into retracted positions within the main profile of the chassis for transporting a pole through narrow openings and past obstacles, such as might be encountered in residential installation requirements. The same wheels can be extended outwardly from the profile of the chassis when a pole is being raised and placed into the earth, and the outwarwd placement of the wheels provides for greater lateral stability of the apparatus when the pole is raised.

A boom means is mounted on the vehicle chassis at one end of the boom so that it can be raised and lowered about a horizontal mounting axis. Further, means are provided for tilting the boom within a range of lateral movements relative to the longitudinal axis of the chassis, and this feature provides for a vertical placement of a pole irrespective of any unlevel terrain upon which the vehicle may be resting. A carriage means is mounted on the boom for movement along the longitudinal axis of the boom. Power operated means provide for the movements of the carriage, and the carriage includes a cradle portion for receiving a pole which is being transported or handled by the apparatus. The cradle portion is mounted on the carriage so as to be rotatable about an axis extending at right angles to and upwardly from the boom when the boom is laying in a horizontal plane. Extension members are provided for lengthening the boom structure, and a novel storage means is provided within the boom structure for receiving a plurality of extension members until they are used for lengthening the boom.

The self-propelled pole handling device of this invention includes additional features which permit a pole to be carried on the vehicle at the same time that a digging means is mounted on the vehicle. Bolster members are provided on the vehicle chassis in positions where they will receive a pole temporarily while the boom is being used for digging a hole into the earth. In this way, the boom may support an earth auger means for a digging operation without being hindered by the pole which is subsequently to be placed in the hole which is dug.

Further features provide for cross country transportation of the self-propelled vehicle as a trailer to a conventional truck or other highway vehicle. Also, devices are provided for lifting the whels of the self-propelled vehicle above their normal ground engaging positions. These and other advantages will become apparent in the more detailed description of this invention, and in that discussion reference will be made to the accompanying drawings in which:

FIGURE 2 is a side elevational view of the apparatus with the boom means in a partially raised position;

FIGURE 3 is a top plan view of the apparatus;

FIGURE 4 is a cross sectional view of the boom means and a carriage means associated therewith as taken on the line 4—4 of FIGURE 3;

FIGURE 5 is an end elevational view showing a means for driving the front wheels of the apparatus;

FIGURE 6 is a side elevational view of the wheel driving arrangement;

FIGURE 9 is an end elevational view of the end of the apparatus opposite to the end shown in FIGURE 5;

Figure 7:
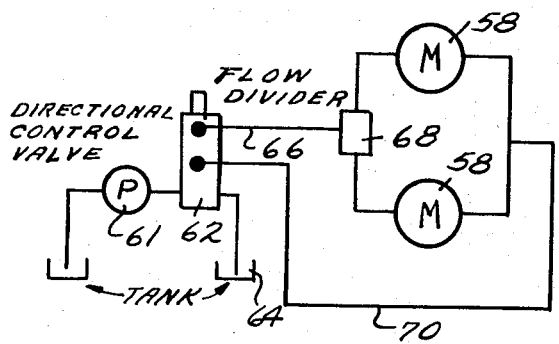
FIGURE 7 is a schematic flow diagram showing a hydraulic system associated with separate hydraulic motors for each driven wheel.

The pole handling device has an overall elongate, narrow configuration so that it can be easily maneuvered past obstacles and into narrow passageways. The chassis 10 of the pole handling device is formed from a one-piece steel weldment. Each end of the elongate chassis is supported by a pair of wheels, and the front pair 12 provide for self-propelling movements of the entire vehicle and the back pair 14 are mounted for lateral movements in and out of the main profile of the vehicle. The chassis includes mounting brackets at each corner for hydraulically actuated outrigger assemblies 16, and also the four corners include mountings for bolsters 18 which can be swung in and out of operative positions for temporarily holding a pole adjacent to a main boom means mounted on the chassis. A power take off point is provided so that a winch 20 can be used, as required. The chassis also includes an engine, fuel tank, battery and hydraulic pump and control means for operating the various devices associated with the vehicle. Also, a hydraulically operated air compressor or electrical generator may be carried on the vehicle.

A boom means 22 is pivotally mounted at its one end to a portion of the chassis 10. The boom means is shown as being mounted about a horizontal axis at 24, and this mounting permits the boom to be raised and lowered through a range of positions, as will be discussed in detail later. The boom means 22 is also mounted in such a way that it can be tilted laterally about the pivotal point 26 (as seen in FIGURE 3). A power operated means, in the form of a double acting hydraulic cylinder 28 is connected to a portion of the vehicle chassis at 30 and to the boom means at 32 for lifting and lowering the boom means about its horizontal mounting axis. Also, power operated means in the form of two double acting hydraulic cylinders 34 are provided for tilting the boom from side to side about its pivotal point 26.

The boom means is constructed to include two parallel hollow members 36 which make up the main body of the boom. The hollow members 36 may be of any cross-sectional configuration, however, they are illustrated as having substantially rectangular cross sections as seen in the FIGURE 4 view. The hollow members make up a boom means which is essentially the length of the vehicle, and the members have open ends at 38 for receiving extension members which can be added to the main boom body. The extension members are of such a cross-sectional configuration and size that they can be stored within the hollow members 36, and then pulled outwardly and attached to the free end of a carriage means associated with the boom means 22 when it is necessary to extend the length of the boom.

The boom means 22 carries a carriage 40 for movement from one end of the boom to the other. The carriage is formed to generally embrace the pair of hollow members making up the main boom structure, and means are provided for reducing friction between the carriage means 40 and its contact with the boom structure. FIGURE 4 illustrates a section of the carriage 40 as it is related to the hollow members 36. Roller, or other bearing means 42, are provided on opposed surfaces of the hollow members 36 for supporting the carriage 40 in its movements along the longitudinal axis of the boom 22. The carriage means 40 is connected at 44 to a power-operated means 46 for movement along the longitudinal axis of the boom.

The power-operated means 46 may be of any suitable construction for extending and retracting the carriage means 40 back and forth along the boom. However, a preferred construction uses a telescoping, hydraulically actuated device having cylindrical sections which can be telescoped relative to one another. In this manner, the carriage means 40 may be placed in any position along the length of the boom 22, and once a position is attained, the carriage may be positively held at that location until further movement is desired. This feature permits the boom means 22 to be adaptable for a number of functions, as will be discussed in detail later.

Figure 1:
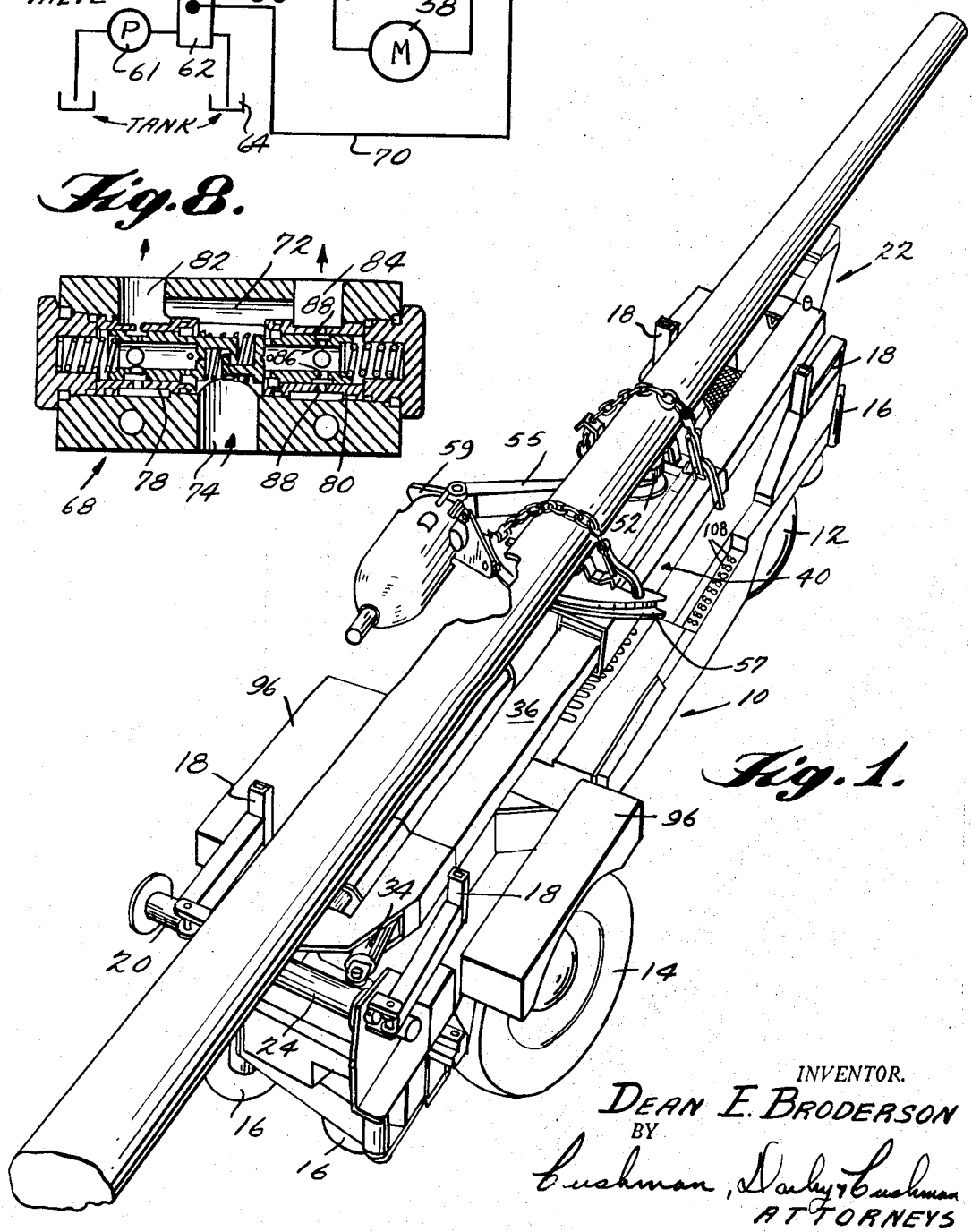
FIGURE 1 is a perspective view of the pole handling apparatus, showing a pole in a horizontal position for transporting on the apparatus.

The carriage means 40 includes a separate support device having two cradle elements 48. As seen in FIGURE 4, the cradles are formed to receive and to hold in place a cylindrical object, such as a utility pole which is supported upon the carriage means 40. Both of the cradle members are connected by framing elements 50 so that they form an essentially unitary construction, and the entire structure is mounted on a turntable 52 so that the cradles may be rotated relative to the remainder of the carriage means. The turntable 52 is of any well known construction, and with this arrangement, the utility pole can be manually rotated relative to the remainder of the boom. It will be appreciated that the axis of rotation for the turntable is at right angles to the longitudinal axis of the boom 22 and extending outwardly from a boom surface which is an upper surface when the boom is in the horizontal position shown in FIGURE 1. The turntable feature of this apparatus is very important in providing additional maneuverability of the apparatus in confined areas. For example, a horizontally carried utility pole may be manually moved to an angular position relative to the vehicle when an obstacle requires such movement for proper placement of the vehicle or the pole at a desired location. Furthermore, this feature permits a vertical positioning of a pole when the boom is raised to its vertical position, irrespective of uneven terrain upon which the vehicle may be resting. The cradle means also includes a pivotal mounting means 53 for accessory devices which may be carried on the carriage 40. For example, a power-operated auger device may be attached to the carriage means at the mounting point 53. By providing for a pivotal swinging of the accessory device, both a utility pole and an accessory device can be carried on the boom at the same time (see FIGURE 1). The accessory device is mounted to the pivotal mounting means 53 by a linking arm 55 which includes jointed sections for placing the device in a preferred position. In the illustrated arrangement the cradle means further includes a trackway 57 for guiding the accessory device carried on the cradle. The accessory device includes a guiding plate 59 which has roller bearing means for engaging and guiding the accessory device relative to the cradle means.

FIGURES 5 and 6 illustrate driving means for the wheels 12 associated with one end of the vehicle. Generally, the pair of wheels at the driving end of the vehicle are mounted on a common horizontal axis at 54, and the two wheels can be turned for steering movements about a vertical axis at 56. The wheels include low profile tires which offer maximum traction and load displacement for the travelling vehicle. Each of the wheels 12 has a separate driving motor 58 so that one wheel may be driven at a different rate from the other wheel in the pair, as is required when turning movements are applied to the pair of wheels. The driving and steering movements of the wheels 12 are hydraulically actuated, and the wheels are mounted to be turned through an arc of 180 degrees.

In the preferred form of the invention, the driving motors 58 are motors which are hydraulically operated in any well known manner. Each of the motors is connected by a chain drive 60 to its respective wheel 12, and the wheels are mounted on separate axles along the axis 54 so that each wheel may be turned at a different rate from the other. The chain drive 60 is a conventional arrangement and sprocket wheels 62 and 64 are connected to the motors 58 and wheels 12 respectively.

Figure 8:
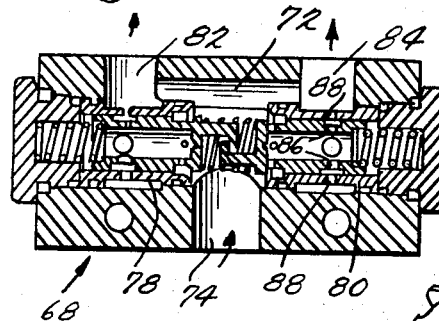
FIGURE 8 is a detailed illustration of a flow dividing valve used with the driving system for the vehicle.

FIGURE 7 illustrates in schematic form the hydraulic control and operation of the two separate motors 58. The pole handling vehicle includes an engine for operating all accessory equipment, and such equipment includes the pump 61 associated with the hydraulic driving system. Oil or other hydraulic fluid is delivered by the pump 61 to the directional control valve 62, and this valve has a neutral position for returning hydraulic fluid back to a reservoir tank 64. When the valve 62 is actuated to direct hydraulic fluid out of line 66, a flow divider 68 sends an equal amount of fluid to each of the hydraulic motors 58. This equal delivery of driving fluid to the motors 58 occurs even though the pressure on each wheel 12 may vary as, for example, when one wheel is on a slick surface. Likewise, if the valve is actuated to direct fluid through the line 70, there is a reverse flow of fluid through each of the motors 58, and the flow divider 68 combines the oil from each motor in equal proportions, thereby serving the same purpose to provide each driving motor with the same amount of oil regardless of relative pressure conditions on the wheels. Thus, the direction control valve 62 can be operated from a neutral position to a forward position for driving the motors 58 in a forward direction by a flow of fluid through the line 66, and to a reverse position for driving motors 58 in a reverse direction through the line 70. When a steering action occurs, one motor 58 requires less oil than the other because of the relative wheel speeds. This condition is compensated for within the flow divider 68 by a bleed orifice which functions to equalize the flow of oil between the motors 58 and excess fluid for a slow motor is diverted to a fast motor. The flow divider 68 is illustrated in greater detail in FIGURE 8, and the bleed orifice is shown at 72. Input flow of fluid into the port 74 is divided into two flow paths through the spool valves 78 and 80. If flow tends to increase in one of the outlets 82 or 84, the pressure drop across the corresponding spool will cause the mechanically linked spools to shift in the direction of increased flow and to restrict the outlet port by a change in alignment of the spool ports 86 with the openings 88. The bleed orifice 72 is located on the output side of the flow divider valve and, therefore, does not affect the function of the divider in receiving and diverting a flow from the line 66.

The steering mechanism for the driving wheel pair 12 is fully powered and includes a double acting hydraulic cylinder and a pivoted steering segment. The segment (not shown) operates a chain which engages a sprocket on a portion of the support axis.

FIGURE 9 shows an end view of the pole handling device and the outrigger assemblies 16 and bolster assemblies 18 are shown in stored and operative positions. The outrigger assemblies 16 are mounted for pivotal movement about vertical axes at 90, and similar arrangements are provided for the outriggers at the opposite end of the vehicle. The outrigger assemblies can be manually swung outwardly from the main profile of the vehicle to positions such as is shown by the dotted lines for one of the assemblies. The assembly 16 contains hydraulic jacking means for extending a jack 92 downwardly, and as with all other hydraulic devices of the vehicle, a conventional source of fluid and means for control are provided for operating the device. When it is desired to stabilize the vehicle in a particular location for placing a utility pole or for using the boom in any other work effort, the outriggers 16 are moved to their operative positions and the jacks 92 are extended to lift the vehicle from the ground to the required extent. The jacks 92 may be operated separately so that one pair of jacks may be extended for a greater distance than the other jacks, and in this way, the entire vehicle can be leveled on uneven terrain. A further function of the jacks 92 at the end of the vehicle illustrated in FIGURE 9 is to provide for a lifting of both wheels 14 above the ground so that those wheels may be extended or retracted laterally relative to the main body of the vehicle. This feature provides for the movement of the wheels 14 into and out of the main profile of the vehicle chassis and, thus, the wheels may be retracted for moving the vehicle through narrow places and then extended outwardly for stabilizing the vehicle in open terrain or in a fixed location. The wheels 14 may be mounted for such lateral movement in any conventional mounting arrangement, and FIGURE 3 illustrates a portion of the vehicle cut away to show a double acting hydraulic cylinder 94 mounted transversely of the chassis to extend and retract one of the wheels 14. The wheels are mounted on sliding support members 95, and the wheel covering portion 96 is carried along with the extension and retraction movements of the wheels 14. The sliding support members for each wheel includes a hydraulic cylinder 94, and the two support members 95 and their hydraulic cylinders are arranged transversely across the vehicle and above one another, as shown in FIGURE 2. The sliding members 95 are rigidly affixed to frame members 97 which carry the wheels 14.

Figure 10:
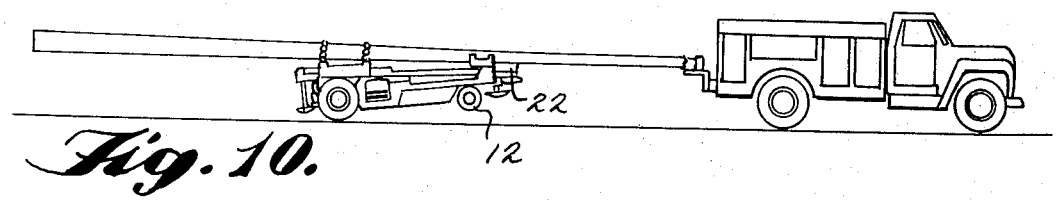
FIGURE 10 illustrates the pole handling device together with an attached pole as coupled to a highway vehicle for cross country transportation.

FIGURE 10 illustrates a feature of the pole handling vehicle of this invention for highway travel and cross country transportation of the vehicle to a job site. The vehicle is shown as having a utility pole attached to the cradle of the boom means 22. The boom is lowered by the power-operated means 28 to a substantially horizontal position. The forward end of the utility pole is then connected to a draw bar which can be attached to a towing pintle of a highway vehicle, such as a truck. The front wheels 12 of the pole handling vehicle can then be drawn upwardly to clear the pavement, and the pole handling vehicle, together with its attached utility pole and other equipment, are in condition for highway travel at a more rapid speed than is attainable with the pole handling vehicle itself. The front wheels 12 may be retracted by a power retraction of the entire front wheel assembly, or alternatively the front end of the vehicle can be lifted by a continued retraction of the power-operated means 28 after the pole is attached to a towing pintle. Continued retraction of 28 would normally cause the boom to move to a position where the free end of the boom is below a horizontal plane taken from the pivotal mounting point 24 of the opposite end of the boom. In this way, the utility pole would be directed slightly downwardly out of the horizontal plane in the forward direction of the vehicle. However, with the utility pole attached to a truck, the retraction of 28 has the effect of lifting the front end of the vehicle, as shown in FIGURE 10.

Figure 11:
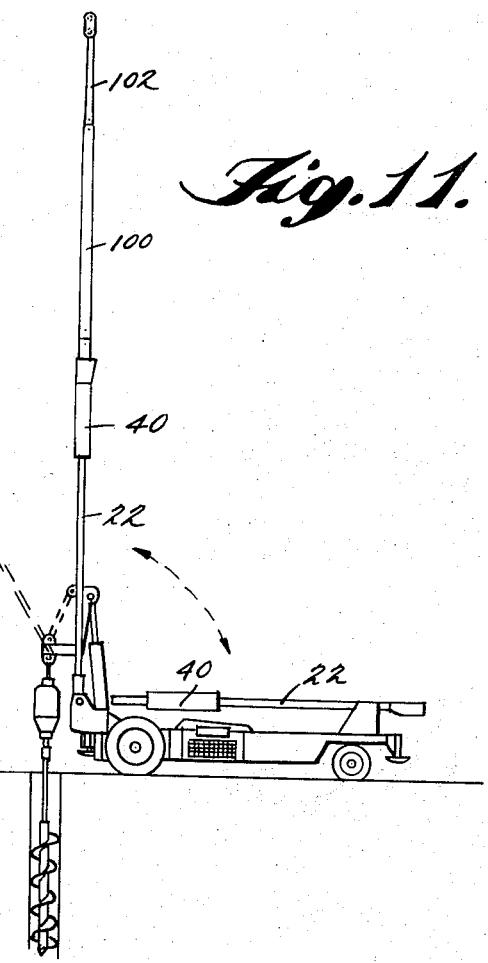
FIGURE 11 illustrates alternative functions for the pole handling device.

FIGURE 11 illustrates additional functions attainable with the pole handling vehicle of this invention. The boom means 22 is shown in solid lines to be in two different positions, although it is understood that only a single boom is mounted on each pole handling vehicle, and the single boom can operate within the range of positions illustrated. In the vertical position, the boom is illustrated as having extension members 100 and 102 added to the normal boom means 22. The extension members 100 may be in the form of rectangular steel tubes which are of such a cross-sectional configuration that they can be fitted within hollow members 36 of the boom 22 for storage. The extension members 100 are fitted into sockets 104 at the outer end of the carriage means 40. The extension members may be locked into position in the sockets by removable bolts or by other known latching devices. Extensions 102 may be formed from a fiberglass material and are designed to fit inside extension sections 100 for storage. The fiberglass extension 102 can be latched in a receiving end of the extensions 100 in a conventional way. Thus, there is provided means for extending the basic boom 22 and for moving the extension portions with a movement of the carriage means 40. When the basic boom 22 is being used in a digging operation near overhead lines, the extension portions 100 and 102 are stored within the boom means 22 and are thereby out of the way of any interference with overhead lines during a digging operation. FIGURE 11 also illustrates in dotted lines the use of a fiberglass personnel bucket 106 which can be connected to the tip end of the fiberglass boom extensions 102. This bucket is used to place personnel in lifted positions for overhead operations, such as tree trimming, transformer placement, and other utility repair and service operations.

Figure 12:
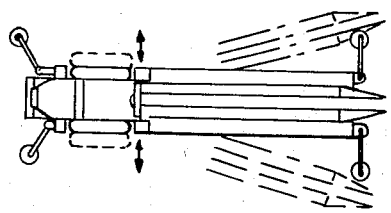
FIGURE 12 is a top plan view showing the range of lateral pivotal movements obtained with the boom means when it is in a horizontal position.
Figure 13:
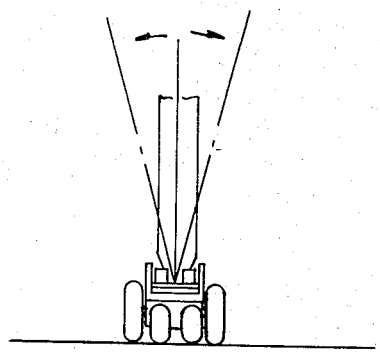
FIGURE 13 is an elevational end view showing the same range of lateral movements for the boom when it is raised to a vertical position.

FIGURES 12 and 13 illustrate a range of lateral movements attainable with the power-operated means 34 associated with the boom means 22. These movements permit the placement of a boom laterally of the profile of the vehicle for digging operations in a greater variety of positions.

In addition to the illustrated structure, the device of this invention also includes the usual controls and accessories for operating the main engine and a hydraulic pump which is driven by the main engine. Also, manually operated hydraulic control valves are provided for all hydraulic powered items. The valves are actuated by a set of three removable handles that fit on stub extensions 108 of the control linkage. One handle is equipped with a thumb operated switch for control of the variable speed throttle actuator. Removable handles are used to reduce the possibility of accidental operation. In addition, an electric remote control is provided for the drive, steer, boom elevation, boom tilt, and boom extension functions. The chassis width considerations make it impractical to include an operator's control station that would allow the operator to ride on the unit as it is carrying a pole and digger through a narrow passageway. The remote control allows the operator to move into the best possible position for controlling the unit through these normally inaccessible areas. Additional remote control functions include the engine ignition, start, throttle control and the trailing wheel brakes.

Having described the structural features of the invention, it can now be appreciated that the pole handling vehicle of this invention provides for greater operational capabilities than heretofore possible. In a typical operation, the pole handling vehicle can load itself with a pole, transport the pole to a desired location, dig a hole for placing the pole in a vertical position in the earth, and lower the pole into a placement position.

As an example of a typical operation, the vehicle is driven to a supply of utility poles, and the outrigger assemblies 16 are swung into operative positions for stabilizing the vehicle at the location. Then the boom means, with an attached cable through a sheave block, is lifted to a substantially vertical position. The boom means can be tilted or moved as is necessary to reach the supply of utility poles, and the pole can be connected to the cable for lifting onto the vehicle. In such a system, the cable may be connected to the winch 20 for winding the cable and lifting the attached utility pole. The pole is lifted onto a pair of bolsters 18 which have been moved into operative position to receive the pole along one side or the other of the vehicle. With the pole held on the bolsters, the cable is detached from the pole, and the boom means is lowered to a horizontal position. Then, the hydraulic means 46 is operated to move the carriage 40 to a point along the boom means which is at the approximate center of gravity of the adjacent utility pole resting on the bolsters. The utility pole is manually rolled onto the cradle portion of the carriage means 40 and lashed into a center position on the cradle elements 48. The bolsters can then be moved back to inoperative positions where they will fall within the main profile of the vehicle. With the pole lashed to the cradle portion, the complete unit can be attached to a tow bar as shown in FIGURE 10. The unit is towed to the job site, and the front wheels 12 of the pole handling vehicle are lowered to the ground so that the unit can be disconnected from the towing vehicle. A crew member can then attach a remote control drive unit to the vehicle and walk alongside the vehicle while it is being driven and controlled. The vehicle is normally driven with the rear wheels 14 in their extended positions, but when an obstruction or narrow gate is encountered, the crew member may extend the outriggers 16 associated with the trailing end of the vehicle and jack the rear wheels 14 out of engagement with the ground, so that they can be retracted to their narrowest positions. After retracting the rear wheels, the vehicle may be driven to the exact location for placement of a pole, and the relatively long utility pole may be rotated in a horizontal plane about the turntable 52 if obstructions are encountered while travelling to the work site. At the pole placement site, all of the outriggers 16 are placed in extended positions, and the vehicle is lifted to a generally level position. The pole is unlatched from its position on the cradle, and the utility pole can then be temporarily rolled onto a pair of bolsters while the boom means is utilized for digging a hole for placement of the pole. For the digging operation, the boom means is lifted to a vertical position and the carriage means 40 is operated to move the digging means to a required depth for the hole. Then, the boom means can be returned to its horizontal position for receiving the utility pole which is resting on the bolsters. With the utility pole once again lashed into position against the cradle elements, the boom means is elevated and shifted to a desired position, and the carriage means 40 is operated to lower the pole into the prepared hole. The reverse sequence of steps would be used to remove a pole from the earth.

Although the pole handling device of this invention has been described with reference to a preferred embodiment, it will be appreciated that variations in the structure and function will become apparent to those skilled in the art, and such variations are intended to be included within the scope of this invention.

What is claimed is:

1. A self-propelled vehicle for handling poles in confined work areas comprising:

an elongate and narrow chassis having supporting pairs of wheels at each end of the chassis, with a first pair of wheels being driven by a motor means and with a second pair of wheels being laterally extendable and retractable relative to the chassis of the vehicle, first power-operated means for extending and retracting said second pair of wheels, thereby providing a narrow configuration for the vehicle when the wheels are retracted and for providing greater lateral stability for the vehicle when the wheels are extended outwardly, a boom means pivotally mounted at one end to said chassis and about a horizontal axis, and including a second power-operated means for moving said boom about its pivotal mounting axis, said boom being movable for a range of horizontal and vertical positions relative to said chassis, and said boom having:

a carriage means mounted on said boom and extendable along said boom means by a third power-operated means connected between said carriage and a portion of said boom means, said carriage means further including a cradle for carrying poles, said cradle being mounted for rotation about an axis at right angles to the longitudinal axis of the boom and in a direction which extends upwardly from an upper surface of said boom means when the boom means is in a horizontal plane, and extension members which can be added to hollow receiving portions of said boom means for extending the length of the boom, said hollow receiving portions providing for storage of said extension members when the extension members are not added to the boom means to lengthen the boom.

2. The apparatus of claim 1 and including fourth power-operated means for tilting said boom means from side to side in directions along the line of the horizontal mounting axis of the boom.

3. The apparatus of claim 1 wherein said carriage means includes a power-operated earth auger means mounted thereto, said earth auger means including a mounting arm which is pivoted to said boom means so that the earth auger means can be carried on the boom means at the same time that a pole is carried on the cradle of said carriage means.

4. The apparatus of claim 1 wherein said chassis includes bolster members which are mounted to opposite ends of said chassis for movement into inoperative positions within the main profile of the chassis and for movement into operative laterally extending positions relative to said chassis.

5. The apparatus of claim 1 wherein said boom means is movable to a position which places a free end of the boom means below a horizontal plane extending through the pivotal mounting axis of an opposite end of the boom, and means for locking the boom means into said position so that a pole may be latched into a carrying position on said cradle of the boom means and the end of the pole may be attached to a pintle of a truck, thereby lifting one pair of wheels at one end of the boom out of contact with a roadway for transporting the pole handling vehicle with said truck.

6. The apparatus of claim 1 wherein the motor means for driving the first pair of wheels comprises separate hydraulically-operated motor means for each wheel and including means for balancing hydraulic fluid flow to the separate motor means in accordance with driving requirements for the separate wheels.

7. The apparatus of claim 1 and including steering means for said first pair of wheels.

8. In an elongate wheeled vehicle for transporting and handling poles, the improvement comprising:
  driving means for driving one pair of wheels associated with said vehicle, and
  a boom means mounted to said vehicle and which can be lifted and lowered about a horizontal pivotal axis, said boom means including a cradle assembly for receiving a pole in alignment with said boom means and for carrying a digging means in association with said boom means, said cradle assembly being mounted for rotational movement about an axis at right angles to the longitudinal axis of said boom means, whereby an attached pole and digging means may be rotated relative to the boom by a rotation of said cradle assembly, and including separate power-operated means for moving said cradle assembly back and forth along the longitudinal axis of said boom means.

9. In an elongate wheeled vehicle for transporting and handling poles, the improvement comprising:
  driving means for driving one pair of wheels associated with said vehicle, and
  a boom means mounted to said vehicle and which can be lifted and lowered about a horizontal pivotal axis, said boom means including a cradle assembly for receiving a pole in alignment with said boom means and for carrying a digging means in association with said boom means, said cradle assembly being mounted for rotational movement about an axis at right angles to the longitudinal axis of said boom means, whereby an attached pole and digging means may be rotated relative to the boom by a rotation of said cradle assembly, and including means for tilting said boom means laterally relative to said vehicle.

10. The improvement of claim 8 wherein said cradle assembly includes a carriage means connected to said separate power-operated means and wherein a cradle member is mounted for rotational movement on said carriage means.

References Cited
UNITED STATES PATENTS

| | | | |
|---|---|---|---|
| 2,284,661 | 6/1942 | Joy. | |
| 2,701,022 | 1/1955 | Chestnutt | 180—26 |
| 2,957,533 | 10/1960 | Lewis et al. | 180—52 X |
| 3,161,301 | 12/1964 | Versch | 214—3 |

HUGO O. SCHULZ, *Primary Examiner.*